United States Patent
Jones

(10) Patent No.: US 9,539,896 B2
(45) Date of Patent: Jan. 10, 2017

(54) SPRING MOUNTING STRUCTURES FOR A FUEL LID

(71) Applicant: NISSAN NORTH AMERICA, INC., Franklin, TN (US)

(72) Inventor: Adam Michael Jones, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/978,283

(22) Filed: Dec. 22, 2015

(65) Prior Publication Data

US 2016/0107521 A1 Apr. 21, 2016

Related U.S. Application Data

(63) Continuation of application No. 14/506,977, filed on Oct. 6, 2014, now Pat. No. 9,227,509.

(51) Int. Cl.
*B60K 15/05* (2006.01)

(52) U.S. Cl.
CPC ......... *B60K 15/05* (2013.01); *B60K 2015/053* (2013.01)

(58) Field of Classification Search
CPC .............. B60K 15/05; B60K 2015/053; B60K 2015/058; B60K 2015/0515; B60K 2015/0546
USPC ................ 296/97.22; 220/86.2; 16/293, 294
See application file for complete search history.

(56) References Cited

U.S. PATENT DOCUMENTS

| | | | | |
|---|---|---|---|---|
| 3,004,282 A | * | 10/1961 | MacCallum | E05F 1/1238 16/294 |
| 3,785,006 A | * | 1/1974 | Metz | E05F 1/1284 16/293 |
| 4,406,379 A | * | 9/1983 | Anderson | B65D 43/24 138/156 |
| 4,527,825 A | * | 7/1985 | Clouse | B60K 15/05 16/287 |
| 4,782,978 A | * | 11/1988 | Appleby | B60K 15/05 220/DIG. 33 |
| 4,971,382 A | * | 11/1990 | Ohno | B60K 15/05 16/291 |
| 6,315,144 B1 | * | 11/2001 | Foltz | B60K 15/0406 220/255 |

(Continued)

*Primary Examiner* — Gregory Blankenship
(74) *Attorney, Agent, or Firm* — Young Basile Hanlon & MacFarlane, P.C.

(57) ABSTRACT

A spring mount assembly has a stationary structure, a movable panel pivotally coupled to the stationary structure for movement between a closed position and an open position, a strip spring having a first mounting portion at a first end and a second mounting portion at a second end opposite the first end, and a first spring mounting structure disposed on one of the movable panel and the stationary structure, the first spring mounting structure comprising a first base for engaging the first mounting portion of the strip spring and at least one spring retention post extending from the first base to retain the first mounting portion against translational disengagement from the first base. A second spring mounting structure is disposed on the other of the movable panel and the stationary structure, the second spring mounting structure comprising a second base for engaging the second mounting portion of the strip spring.

18 Claims, 6 Drawing Sheets

(56) References Cited

U.S. PATENT DOCUMENTS

| | | | | |
|---|---|---|---|---|
| 7,549,694 | B2 * | 6/2009 | Scott | B60K 15/04 |
| | | | | 296/97.22 |
| 7,566,089 | B2 * | 7/2009 | Alfaro | B60K 15/05 |
| | | | | 280/853 |
| 9,227,509 | B1 * | 1/2016 | Jones | B60K 15/05 |
| 9,376,012 | B2 * | 6/2016 | Brown | B60K 15/05 |
| 2003/0098304 | A1 | 5/2003 | Foltz | |

\* cited by examiner ial application Ser. No. 14/506,977, filed on Oct. 6, 2014, the entirety of which is incorporated herein by reference.

SPRING MOUNTING STRUCTURES FOR A FUEL LID

CROSS REFERENCE TO RELATED APPLICATION

This application is a continuation of U.S. patent application Ser. No. 14/506,977, filed on Oct. 6, 2014, the entirety of which is incorporated herein by reference.

TECHNICAL FIELD

The embodiments herein relate to a fuel lid pivotally coupled to a vehicle body structure, and more specifically to the mounting structures for a spring engaged between the fuel lid and the vehicle body structure.

BACKGROUND

Many vehicles have a fuel tank designed to store fuel for their engines. These vehicles commonly contain a fuel filling tube that extends from the fuel tank to a fuel supply inlet opening near an outer surface of the vehicle. In these vehicles, a fuel cap may optionally be used to close the fuel supply inlet opening to prevent unwanted materials from entering into the fuel tank and limit evaporative emissions from exiting the fuel tank. Moreover, a fuel lid may be coupled to the body structure of the vehicle for movement between a closed position and an open position. The fuel lid can be flush with the body of the vehicle when in the closed position. When the fuel lid is in the open position, the fuel cap is exposed for removal from the fuel supply inlet opening, and with the fuel cap removed, fuel or other substances may be added to the fuel tank through the fuel filling tube. After filling the fuel tank, the fuel cap can be replaced and the fuel lid can be put in the closed position.

SUMMARY

Disclosed herein are embodiments of a vehicle and a fuel lid assembly for a vehicle. In one aspect, a vehicle comprises a vehicle body structure, a fuel lid pivotally coupled to the vehicle body structure for movement between a closed position and an open position, and a strip spring engaged between the fuel lid and the vehicle body structure. The strip spring has a first mounting portion and an opposing second mounting portion, and defines an opening at the second mounting portion. A first spring mounting structure is at one of the fuel lid or the vehicle body structure. The first spring mounting structure has a first base for engaging the first mounting portion. A second spring mounting structure is at the other of the fuel lid and the vehicle body structure. The second spring mounting structure has a second base for engaging the second mounting portion and a spring retention tab protruding from the second base. The spring retention tab is received by the opening defined at the second mounting portion and retains the second mounting portion to the second spring mounting structure.

In another aspect, a fuel lid assembly for a vehicle comprises a vehicle body mounting bracket configured for connection with a vehicle body structure, a fuel lid pivotally coupled to the vehicle body mounting bracket for movement between a closed position and an open position through an intermediate transition position, and a strip spring engaged between the vehicle body mounting bracket and the fuel lid in an over center configuration, with the strip spring compressing with movement of the fuel lid from either the closed position or the open position towards the transition position and decompressing with movement of the fuel lid through the transition position to bias the fuel lid towards either the closed position or the open position. The strip spring has a vehicle-side mounting portion engaged with the vehicle body mounting bracket and a lid-side mounting portion engaged with the fuel lid, and defines an opening at the vehicle-side mounting portion. A vehicle-side spring mounting structure at the vehicle body mounting bracket has a vehicle-side base for engaging the vehicle-side mounting portion and a spring retention tab protruding from the vehicle-side base. The spring retention tab is received by the opening defined at the vehicle-side mounting portion and retains the vehicle-side mounting portion to the vehicle-side spring mounting structure.

These and other aspects will be described in additional detail below.

BRIEF DESCRIPTION OF THE DRAWINGS

The various features, advantages and other uses of the present apparatus will become more apparent by referring to the following detailed description and drawing in which.

DETAILED DESCRIPTION

The vehicle according to this description includes a fuel lid pivotally mounted to the remainder of the vehicle for movement between an open position and a closed position. In the vehicle, a strip spring is used in support of the fuel lid's movement between the open position and the closed position. According to a non-limiting example, the strip spring is engaged between the fuel lid and the remainder of the vehicle in a so-called over-center configuration. The strip spring and respective spring mounting structures for the strip spring at the fuel lid and the remainder of the vehicle are configured to promote both easy installation of the strip spring and retention of the strip spring once installed.

Figure 1:
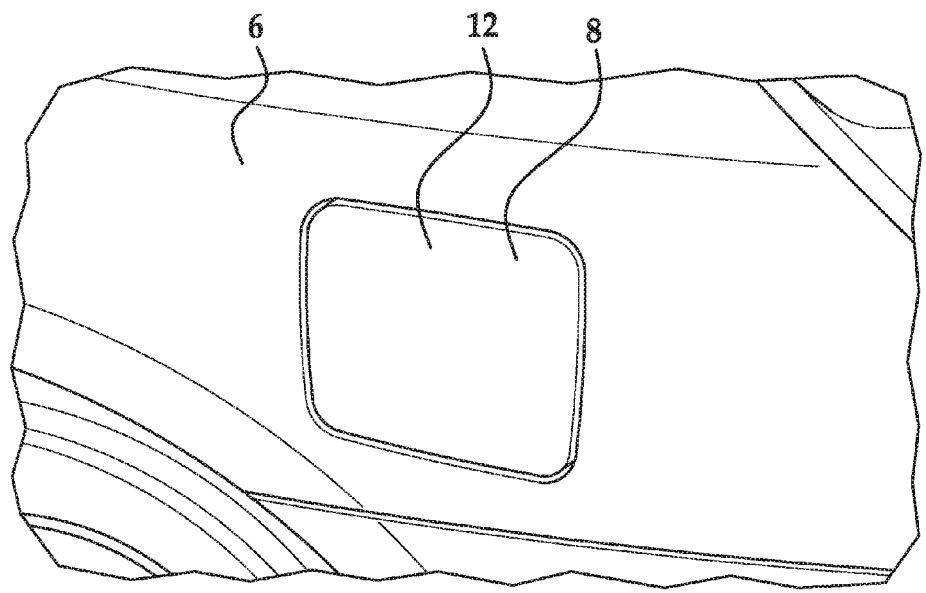
FIG. 1 is a partial perspective view of a vehicle with a fuel lid pivotally coupled to a vehicle body structure for the vehicle, with the fuel lid in a closed position.
Figure 2:
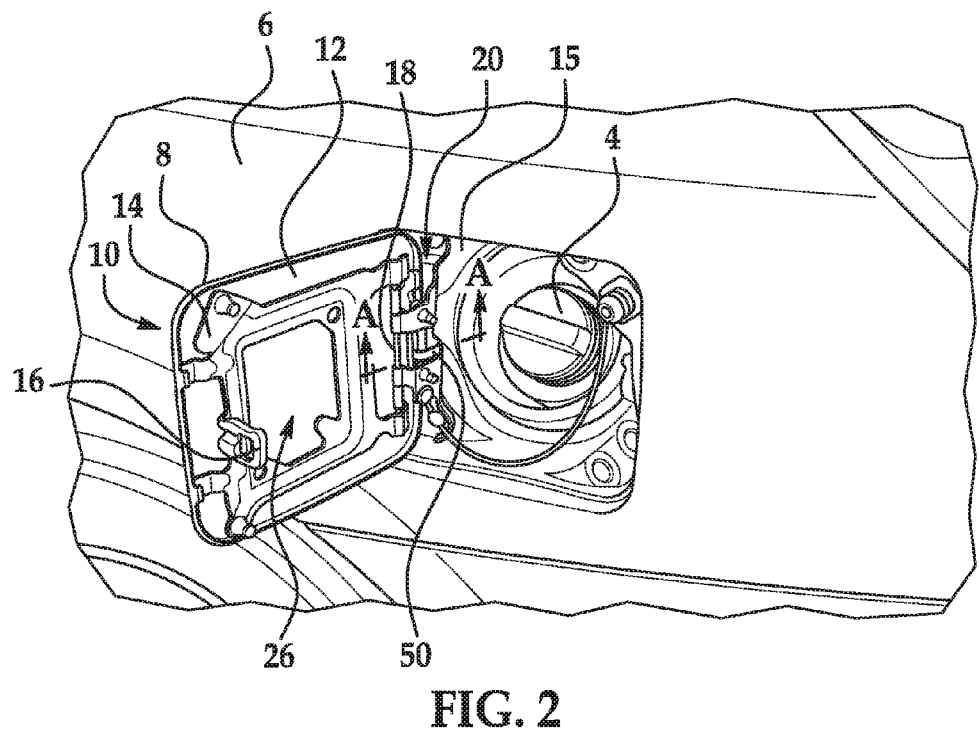
FIG. 2 is a partial perspective view of the vehicle with the fuel lid in an open position, showing the components of an example fuel lid assembly that includes a vehicle body mounting bracket connected to the body structure, a fuel lid plate of the fuel lid, a strip spring engaged between the vehicle body mounting bracket and the fuel lid in an over center configuration, a lid-side spring mounting structure at the fuel lid and a vehicle-side spring mounting structure at the vehicle body mounting bracket.

FIGS. 1 and 2 are perspective views generally showing the rear portion of an exterior body surface of a vehicle 6 with a fuel lid 12. The fuel lid 12 is pivotally coupled to the remainder of the vehicle 6 for movement between a closed position and an open position. In FIG. 1, the fuel lid 12 is in the closed position. In the closed position, fuel lid 12 may, as shown, be generally flush with the exterior body surface of the vehicle 6. In FIG. 2, the fuel lid 12 is in the open position, in which the fuel lid 12 extends outwardly from the exterior body surface of the vehicle 6 to expose a fuel cap 4 used for sealing the fuel supply inlet opening to a fuel tank (not shown).

The fuel lid 12 is coupled to the vehicle 6 by an example fuel lid assembly 10. As shown, the fuel lid assembly 10 includes the fuel lid 12, a vehicle body mounting bracket 20 and a strip spring 50 engaged between the fuel lid 12 and the vehicle body mounting bracket 20. According to the example, the fuel lid 12 includes a fuel lid cover 8 attached to a fuel lid plate 14. The fuel lid plate 14 and the fuel lid cover 8 may, as shown, be attached by crimping outer portions of the fuel lid plate 14 to a fuel lid cover 8. The fuel lid plate 14 and the fuel lid cover 8 may alternatively be attached by other means such as welding, screwing or an adhesive, for instance. As shown, the fuel lid plate 14 is hinged to the vehicle body mounting bracket 20 by a hinge 18, and the body mounting bracket 20 is connected to a body structure 15 of the vehicle 6. With this arrangement, the fuel lid 12 is supported for pivotal movement about the hinge 18 from the closed position toward the open position and from the open position to the closed position.

Figure 3:
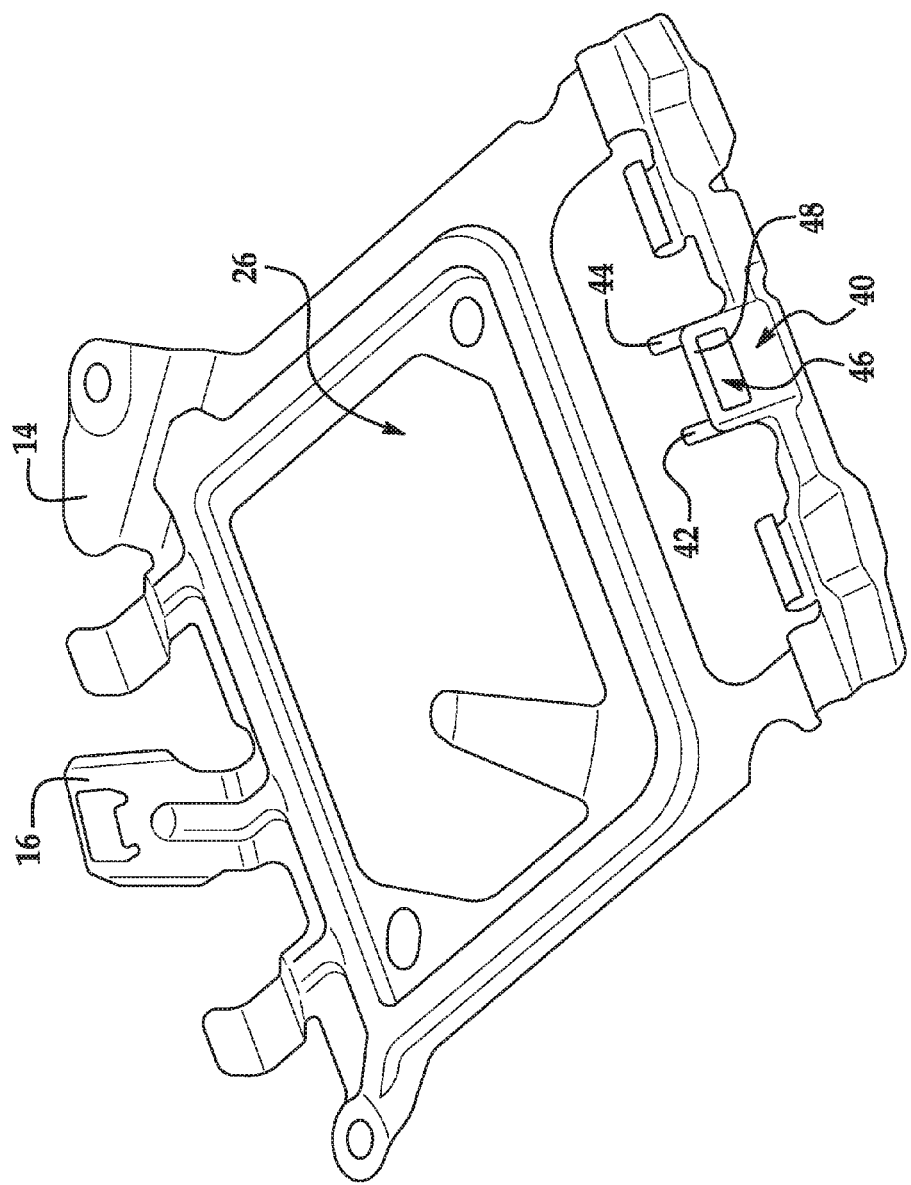
FIG. 3 is a perspective view of the fuel lid plate, showing the lid-side spring mounting structure.

As shown with additional reference to FIG. 3, the fuel lid plate 14 includes a latch 16 and a lid-side spring mounting structure 40, and defines a central opening 26. The latch 16 is designed for the selective engagement with the body structure 15 or otherwise with the vehicle 6 to secure the fuel lid plate 14 and thus the fuel lid 12 to the vehicle 6 when the fuel lid 12 is in the closed position, and for selective disengagement to allow a user to move the fuel lid 12 from the closed position toward and to the open position. The opening 26 can be sized and shaped for holding the fuel cap 4 when the fuel lid 12 is in an open position and the fuel cap 4 is removed. The opening 26 can further be shaped and sized to allow clearance for the fuel cap 4 within the opening 26 when the fuel lid 12 is in the closed position. The latch 16 and the lid-side spring mounting structure 40 may be located at opposing portions of the fuel lid plate 14. As shown, the latch 16 and the lid-side spring mounting structure 40 are located at opposing central end portions of the fuel lid plate 14, with the opening 26 defined between the latch 16 and the lid-side spring mounting structure 40.

Figure 4:
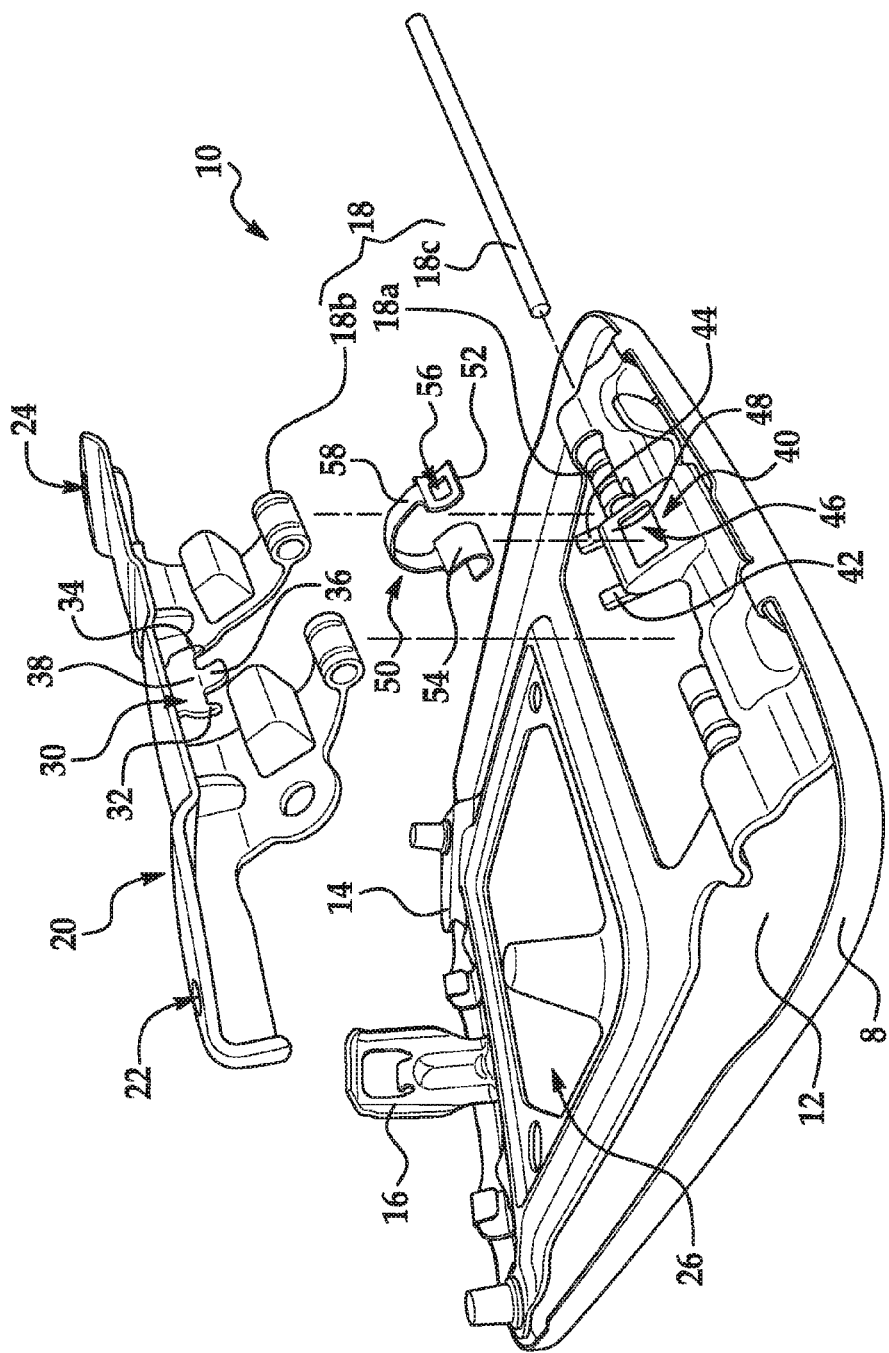
FIG. 4 is an exploded view of the example fuel lid assembly.

The fuel lid assembly 10, including the fuel lid 12 having the fuel lid plate 14 and the lid-side spring mounting structure 40, the body mounting bracket 20 and the strip spring 50, is shown in FIG. 4. With additional reference to FIG. 4, in the illustrated example of the fuel lid plate 14, the lid-side spring mounting structure 40 extends from the fuel lid plate 14 and includes a lid-side spring retention post 42, a lid-side spring retention post 44 and a lid-side base 48 at its distal end. The lid-side spring mounting structure 40 further defines a lid-side spring receiving opening 46 bordered by the lid-side base 48.

The lid-side spring receiving opening 46 is sized and shaped for accommodating the selective hooking engagement between the lid-side base 48 and the lid-side mounting portion 54 of the strip spring 50, as well as for clearance for the lid-side mounting portion 54 of the strip spring 50 to pivot about the lid-side base 48 as the fuel lid 12 pivots about the hinge 18. As shown, the lid-side spring receiving opening 46 has a generally rectangular profile, although in other examples, the lid-side spring receiving opening 46 could have other rectilinear profiles, or, for instance, a curvilinear profile.

The lid-side spring retention post 42 and the lid-side spring retention post 44 are generally configured as tabs protruding from the lid-side base 48 at its opposing sides. The lid-side spring retention post 42 and the lid-side spring retention post 44 are spaced for accommodating the width of a lid-side mounting portion 54 of the strip spring 50 engaged to the lid-side base 48.

The lengths of the lid-side spring retention post 42 and the lid-side spring retention post 44 can generally support the retention of the strip spring 50 within the fuel lid assembly 10 by retaining the lid-side mounting portion 54 of the strip spring 50 from translational disengagement from the lid-side base 48, either in a stationary condition of the fuel lid assembly 10, during the movement of the fuel lid 12 between the closed position and the open position, or both. Optionally, only one of the spring retention post 42 or the lid-side spring retention post 44 may be included to support the retention of the strip spring 50 within the fuel lid assembly 10 as described above. It will also be understood that the lengths of the lid-side spring retention post 42 and the lid-side spring retention post 44 can additionally generally be configured to avoid interference with the body mounting bracket 20 during the movement of the fuel lid 12 between the closed position and the open position.

As shown, the hinge 18 hinging the fuel lid plate 14 to the body mounting bracket 20 is implemented by one or more knuckles 18a formed by the fuel lid plate 14, one or more knuckles 18b formed by the body mounting bracket 20 and mortised with the knuckles 18a formed by the fuel lid plate 14, and a pin 18c extending between the knuckles 18a and the knuckles 18b to pivotally couple the fuel lid plate 14 to the body mounting bracket 20. It will be understood that other configurations may be used to implement the hinge 18.

The vehicle body mounting bracket 20 may be configured for connection to the vehicle 6. For example, as shown, the body mounting bracket 20 includes a body mounting opening 22 and a body mounting opening 24 located at opposing portions of the vehicle body mounting bracket 20. The body mounting openings 22 and 24 are configured to allow the passing of a fastener or other device to secure the vehicle body mounting bracket 20 to the body structure 15 or otherwise to the vehicle 6. In application, the vehicle 6 and the connected vehicle body mounting bracket 20 will remain stationary as the fuel lid plate 14 either similarly remains stationary or is moved by a user between the open position and the closed position.

The vehicle body mounting bracket 20 further includes a vehicle-side spring mounting structure 30. In the illustrated example, the vehicle-side spring mounting structure 30 extends from the body mounting bracket 20. The vehicle-side spring mounting structure 30 may, as shown, extend from a central rear portion of the body mounting bracket 20. In alternative examples, the vehicle-side spring mounting structure 30 may extend from the body mounting bracket 20 at another location, such as at a under portion of the body mounting bracket 20, for instance.

The vehicle-side spring mounting structure 30 includes a vehicle-side spring tab 32, a vehicle-side spring tab 34, a vehicle-side spring retention tab 36 and a vehicle-side base 38 at its distal end. The vehicle-side spring tab 32 and the vehicle-side spring tab 34 are generally configured as tabs protruding from the vehicle-side base 38 at its opposing sides. The vehicle-side spring tab 32 and the vehicle-side spring tab 34 are spaced for accommodating the width of a vehicle-side mounting portion 52 of the strip spring 50 engaged to the vehicle-side base 38, as explained in additional detail below.

The lengths of the vehicle-side spring tab 32 and the vehicle-side spring tab 34, similarly to those of the lid-side spring retention post 42 and the lid-side spring retention post 44 described above, can generally support the retention of the strip spring 50 within the fuel lid assembly 10 by retaining the vehicle-side mounting portion 52 of the strip spring 50 from translational disengagement from the vehicle-side base 38, either in a stationary condition of the fuel lid assembly 10, during the movement of the fuel lid 12 between the closed position and the open position, or both. Optionally, only one of the vehicle-side spring tab 32 and the vehicle-side spring tab 34 may be included to support the retention of the strip spring 50 within the fuel lid assembly 10 as described above. It will also be understood that the lengths of the vehicle-side spring tab 32 and the vehicle-side spring tab 34 can additionally generally be configured to avoid interference with the fuel lid 12 during the movement of the fuel lid 12 between the closed position and the open position.

The vehicle-side spring retention tab 36 protrudes from the vehicle-side base 38. The vehicle-side spring retention tab 36 is generally shaped and sized for receipt within an opening 56 defined at the vehicle-side mounting portion 52 of the strip spring 50 engaged to the vehicle-side base 38. As described in additional detail below, the vehicle-side spring retention tab 36 supports the retention of the strip spring 50 within the fuel lid assembly 10 by engaging one or multiple portions of the vehicle-side mounting portion 52 bordering the opening 56 to retain the vehicle-side mounting portion 52 with respect to one or both of the vehicle-side spring mounting structure 30 or its vehicle-side base 38, either in a stationary condition of the fuel lid assembly 10, during the movement of the fuel lid 12 between the closed position and the open position, or both.

As generally shown, the vehicle-side spring retention tab 36 protrudes from the vehicle-side base 38 at an angle from the vehicle-side spring mounting structure 30. The angle can support, for instance, the provision of clearance between the vehicle-side mounting portion 52 of the strip spring 50 and the vehicle-side spring retention tab 36 during the movement of the fuel lid 12 between the closed position and the open position. As shown, in one non-limiting example, the vehicle-side spring retention tab 36 may protrude from the vehicle-side base 38 at an approximately 30 degree angle from the vehicle-side spring mounting structure 30 and the extending vehicle-side spring tabs 32, 34 and generally toward the lid-side spring mounting structure 40. In other examples, it will be understood that the angle could be greater than or less than approximately 30 degrees, for instance.

The strip spring 50 as generally shown in FIG. 4 includes the vehicle-side mounting portion 52, the lid-side mounting portion 54, an opening 56 defined at the vehicle-side mounting portion 52, and a spring body 58 interconnecting the vehicle-side mounting portion 52 with the lid-side mounting portion 54. In the illustrated example configuration of the strip spring 50, the vehicle-side mounting portion 52 and the lid-side mounting portion 54 are positioned at opposing distal ends of the strip spring 50. In other examples, it will be understood that one or both of the vehicle-side mounting portion 52 and the lid-side mounting portion 54 may be alternatively positioned.

The strip spring 50 is generally configured for engagement between the fuel lid 12 and the vehicle 6. More particularly, in accordance with the illustrated configuration of the fuel lid assembly 10, the vehicle-side mounting portion 52 of the strip spring 50 is configured for engagement with the vehicle-side base 38 of the vehicle-side spring mounting structure 30 extending from the body mounting bracket 20, and the lid-side mounting portion 54 of the strip spring 50 is configured for engagement with the lid-side base 48 of the lid-side spring mounting structure 40 extending from the fuel lid plate 14. Although this description follows with reference to this general configuration of the fuel lid assembly 10, it will be understood that in other examples of the fuel lid assembly 10, the illustrated and described configuration and features of the vehicle-side spring mounting structure 30 may be included with the fuel lid plate 14 or otherwise with the fuel lid 12 instead of with the body mounting bracket 20, and that the illustrated and described configuration and features of the lid-side spring mounting structure 40 may be included with the body mounting bracket 20 instead of with the fuel lid plate 14, with the orientation of the strip spring 50 correspondingly being reversed.

With movement of the fuel lid 12 between the closed position and the open position, the vehicle-side base 38 of the vehicle-side spring mounting structure 30 extending from the body mounting bracket 20 rotates about the lid-side base 48 of the lid-side spring mounting structure 40 extending from the fuel lid plate 14, as explained below with reference to FIGS. 6A-D, 7 and 8.

Figure 5:
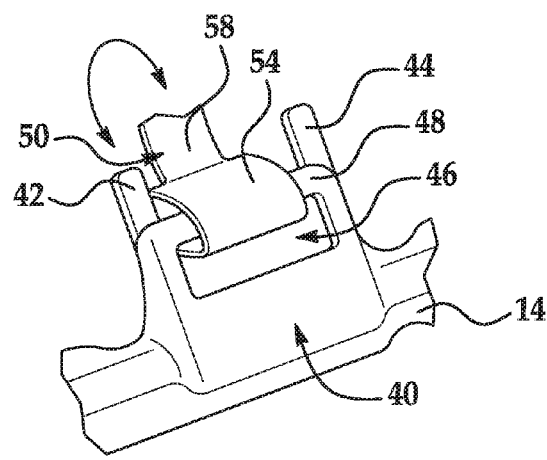
FIG. 5 is a detailed perspective view of the lid-side spring mounting structure shown in FIG. 3.

As shown with additional reference to FIG. 5, the lid-side mounting portion 54 of the strip spring 50 is configured for the selective hooking engagement with the lid-side base 48 permissive of the strip spring 50 pivoting about the lid-side base 48 as the fuel lid 12 pivots about the hinge 18. As explained above, the lid-side spring mounting structure 40 further defines the lid-side spring receiving opening 46 bordered by the lid-side base 48 defined across the distal end of the lid-side spring mounting structure 40 for accommodating the hooking engagement between the lid-side base 48 and the lid-side mounting portion 54, as well as for clearance for the lid-side mounting portion 54 of the strip spring 50 to pivot about the lid-side base 48 as the fuel lid 12 pivots about the hinge 18

The lid-side mounting portion 54 has a curved profile defining an open hook sized to receive the lid-side base 48. The open hook is generally sized larger than the thickness of the lid-side base 48 so that the lid-side mounting portion 54 can pivot about the lid-side base 48 with movement of the fuel lid 12 between the closed position and the open position, with a length sufficient to secure the lid-side mounting portion 54 to the lid-side spring mounting structure 40 with movement of the fuel lid 12 between the closed position and the open position. At least a portion of the lid-side mounting portion 54 is positioned between the lid-side spring retention post 42 and the lid-side spring retention post 44 to retain the lid-side mounting portion 54 of the strip spring 50 from translational disengagement from the lid-side base 48.

With additional general reference to FIGS. 6A-D, the vehicle-side mounting portion 52 of the strip spring 50 has an outwardly curved profile to define a palm-like concavity for receiving the vehicle-side base 38 of the vehicle-side spring mounting structure 30. This configuration may, for instance, allow for continuous contact between the vehicle-side mounting portion 52 and the vehicle-side base 38 as the lid-side base 48 rotates about the vehicle-side base 38 of the lid-side spring mounting structure 40 and rocks against the vehicle-side mounting portion 52 of the strip spring 50. In other examples, the vehicle-side mounting portion 52 may have other profiles, such as straight or angled profiles, for instance.

Moreover, the tab receiving opening 56 is defined at the mounting portion 52 of the strip spring 50 for receiving the vehicle-side spring retention tab 36 protruding from the vehicle-side base 38 in order to retain the strip spring 50 within the fuel lid assembly 10. As shown, the width of the tab receiving opening 56 is larger than the width of the vehicle-side spring retention tab 36 so that it does not restrict the movement of the vehicle-side spring retention tab 36 as the fuel lid 12 rotates between the closed and the open positions. The tab receiving opening 56 may, for example as generally shown, have a similar width as the spring body 58, or, may have a smaller or larger width than the width of the spring body 58. As shown, the tab receiving opening 56 has a generally rectangular profile, although in other examples, the tab receiving opening 56 could have other rectilinear profiles, or, for instance, a curvilinear profile.

The spring body 58 of the strip spring 50 is curved inwardly in an opposing direction to the vehicle-side mounting portion 52 or the lid-side mounting portion 54. The spring body 58 may include one or more segment portions for allowing the spring body 58 to compress as the fuel lid 12 rotates between the closed position and the open position. As shown, the spring body 58 may optionally be curved in four segment portions that are similar to half of an octagon. Each segment portion can be the same dimension or a different dimension from the other segment portions. In another examples, the spring body 58 may have less than or greater than four segment portions, or, may have a single segment with an arched shape.

Figure 6A:
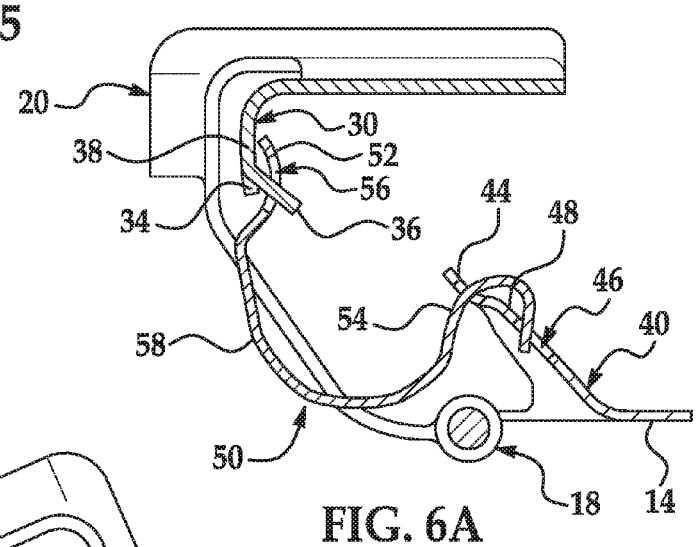
FIGS. 6A-D are cross sectional views of the fuel lid assembly taken at a position similar to the line A-A in FIG. 1, showing the strip spring, the lid-side spring mounting structure and the vehicle-side spring mounting structure with the fuel lid in the closed position, a transition position between the closed position and the open position, the open position and an over-travel position past the closed position, respectively.
Figure 7:
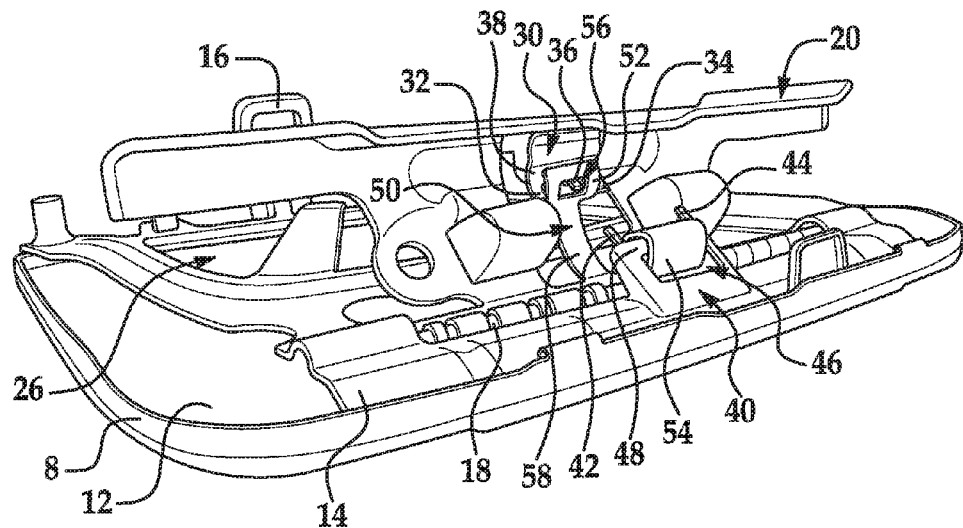
FIG. 7 is a perspective view of the fuel lid assembly with the fuel lid in the closed position.

The fuel lid assembly 10 is shown with the fuel lid in its closed position in FIGS. 6A and 7. As shown, the lid-side mounting portion 54 of the strip spring 50 rests in hooking engagement with the lid-side base 48 of the lid-side spring mounting structure 40 between the lid-side spring retention posts 42, 44, with a portion of the lid-side mounting portion 54 inserted through the lid-side spring receiving opening 46. The vehicle-side spring retention tab 36 extends from a distal end of the vehicle-side spring mounting structure 30 towards the lid-side spring mounting structure 40. The vehicle-side mounting portion 52 of the strip spring 50 rests on the vehicle-side base 38, as shown, or otherwise near the vehicle-side base 38, between the body-side spring tabs 32, 34, with the vehicle-side spring retention tab 36 inserted through the tab receiving opening 56. With the fuel lid 12 in the closed position, the strip spring 50 may be in a resting, non-compressed condition, or, in a slightly compressed condition.

As the fuel lid 12 moves from the closed position towards the open position, the fuel lid 12 rotates about the hinge 18, rotating the vehicle-side spring mounting structure 30 and its vehicle-side base 38 in a direction towards the lid-side spring mounting structure 40 and its lid-side base 48. This rotation causes the strip spring 50 to compress between the vehicle-side base 38 and the lid-side base 48, with the vehicle-side mounting portion 52 and the lid-side mounting portion 54 becoming closer in proximity.

Figure 6B:
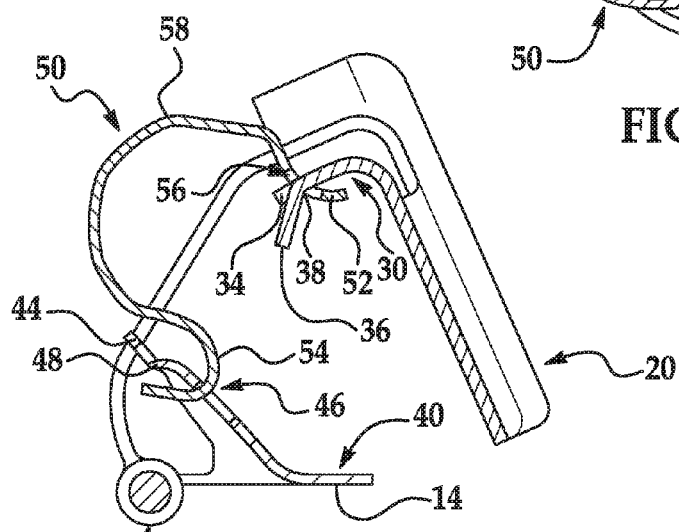

The strip spring 50 compresses until it reaches the intermediate position shown in FIG. 6B between the closed position and the open position. As shown, the strip spring 50 is engaged between the vehicle-side base 38 and the lid-side base 48 in a so-called over-center configuration, in which with movement of the fuel lid 12 through the intermediate position, the fuel lid will be biased for movement towards either the closed position or the open position. In particular, when the fuel lid 12 is moved from the closed position through intermediate position, the fuel lid 12 will be biased for movement towards the open position. In contrast, when the fuel lid 12 is moved from the open position through the intermediate position, the fuel lid 12 will be biased for movement to the closed position.

Figure 6C:
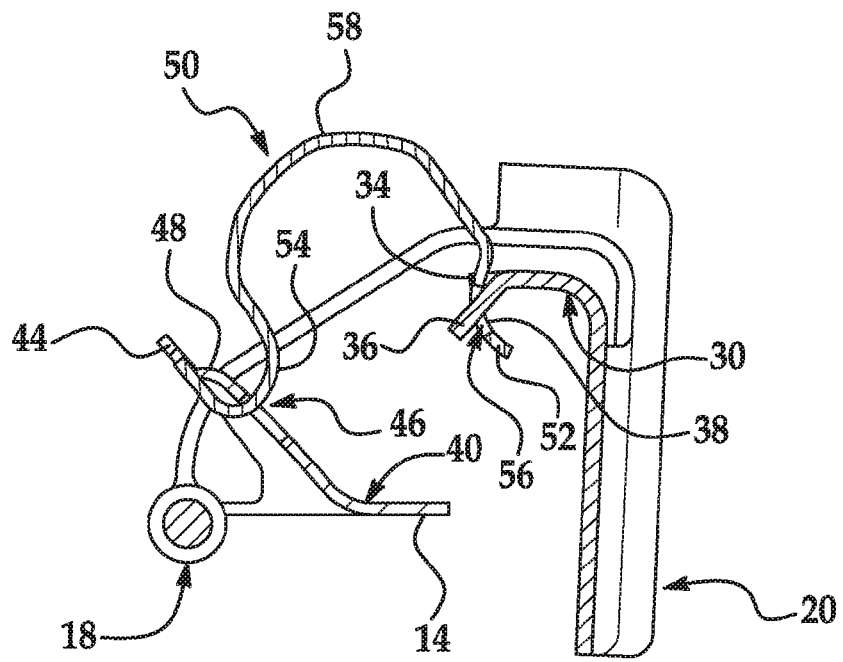
Figure 8:
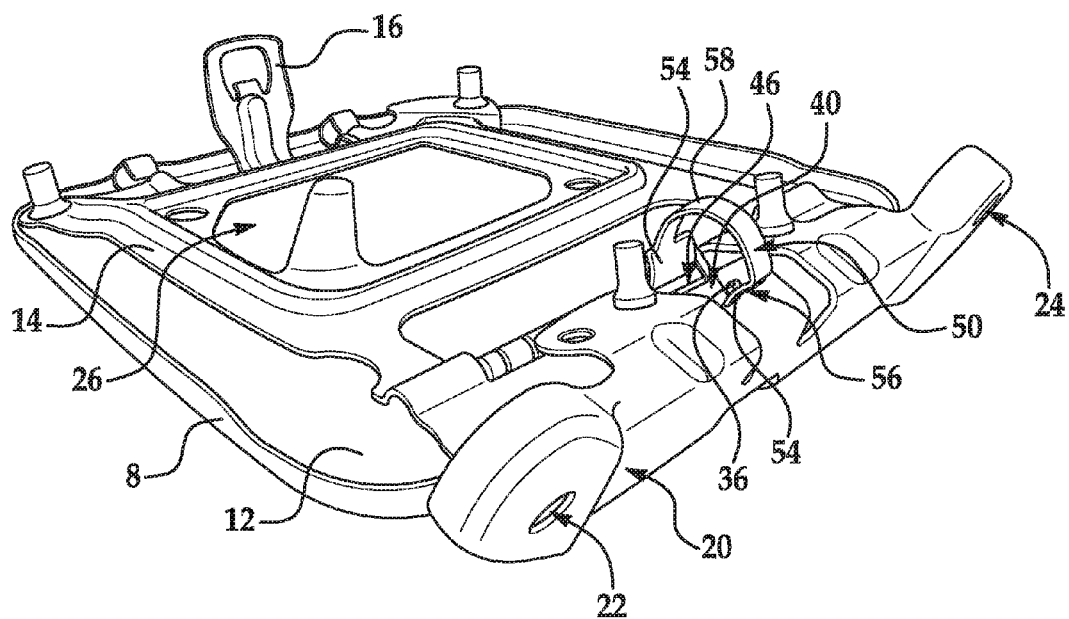
FIG. 8 is perspective view of the fuel lid assembly with the fuel lid in the open position.

The fuel lid assembly 10 is shown with the fuel lid 12 in its open position in FIGS. 6C and 8. As shown, the body mounting bracket 20 is positioned beyond an end of the fuel lid 12. The body-side spring tabs 32, 34 and the vehicle-side spring retention tab 36 are positioned toward the lid-side spring mounting structure 40; however, they are positioned on an opposing side of the lid-side spring mounting structure 40 than when the fuel lid 12 is in a closed position. As shown, the body-side spring tabs 32, 34 and the vehicle-side spring retention tab 36, and particularly the angle at which the vehicle-side spring retention tab 36 protrudes from the vehicle-side base 38, can be generally configured to provide clearance between the vehicle-side mounting portion 52 of the strip spring 50 and the vehicle-side spring retention tab 36, as well as between the vehicle-side spring mounting structure 30 and the lid-side spring mounting structure 40 during the movement of the fuel lid 12 between the closed position and the open position.

When the fuel lid 12 is in the open position, the vehicle-side mounting portion 52 remains in contact with the vehicle-side base 38 of the vehicle-side spring mounting structure 30. The strip spring 50 is compressed when the fuel lid 12 is in the open position; however, the strip spring 50 is less compressed than when the fuel lid 12 is in an intermediate position. More specifically, the spring body 58 is in a compressed position, which applies force to the vehicle-side mounting portion 52. The vehicle-side mounting portion 52 applies force to the vehicle-side spring mounting structure 30. Because there is force applied to the vehicle-side spring mounting structure 30, the vehicle-side spring mounting structure 30 will remain in an open position until a user applies a force to pivot the fuel lid 12 towards and through the intermediate position.

The lid-side spring mounting structure 40 remains intact to the fuel lid plate 14 as the vehicle-side spring mounting structure 30 rotates about the hinge 18; however, the lid-side mounting portion 54 rotates about the lid-side base 48. As the fuel lid 12 moves from the closed position to an open position, the lid-side mounting portion 54 may apply additional force to the lid-side base 48 and a larger portion of the lid-side mounting portion 54 is inserted through the lid-side spring receiving opening 46. Because there is force applied to the lid-side spring mounting structure 40, the fuel lid 12 will remain in an open position until a user applies a greater force to rotate the fuel lid 12 to an intermediate position and to a closed position.

Figure 6D:
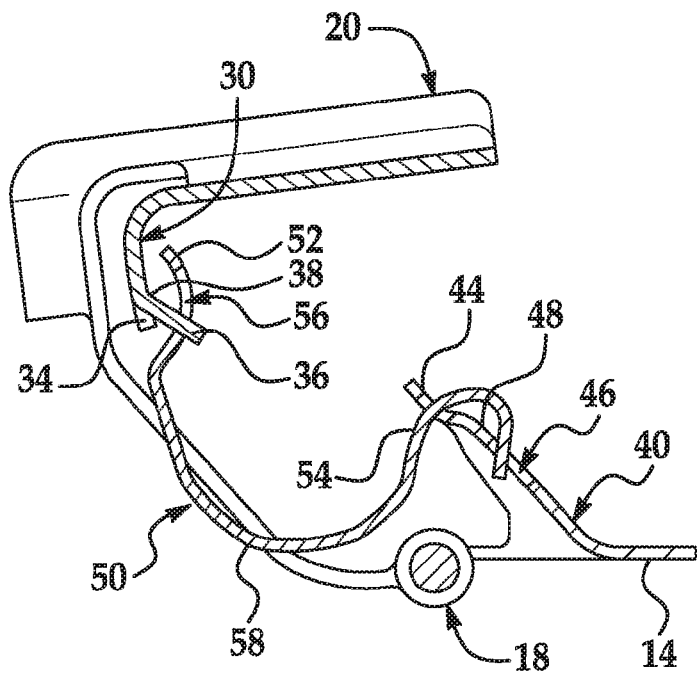

The fuel lid assembly 10 is shown with the fuel lid in over-travel position past the closed position in FIG. 6D. The cycling of the of the fuel lid 12 between the closed position and the open position may cause the strip spring 50 to undergo permanent set, bringing the vehicle-side mounting portion 52 and the lid-side mounting portion 54 of the strip spring 50 closer in proximity.

As shown, with the lid-side mounting portion 54 of the strip spring 50 resting in hooking engagement with the lid-side base 48 of the lid-side spring mounting structure 40, the vehicle-side mounting portion 52 of the strip spring 50 has the tendency in a permanent set condition to withdraw from the vehicle-side base 38. However, with the vehicle-side spring retention tab 36 inserted through the tab receiving opening 56, the vehicle-side spring retention tab 36 engages with a longitudinally outboard portion of the vehicle-side mounting portion 52 of the strip spring 50 bordering the tab receiving opening 56. This not only retains the strip spring 50 within the fuel lid assembly 10, but extends it beyond its resting, non-compressed condition in order to remove it from the permanent set condition.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A spring mount assembly, comprising:
    a stationary structure;
    a movable panel pivotally coupled to the stationary structure for movement between a closed position and an open position;
    a strip spring having a first mounting portion at a first end and a second mounting portion at a second end opposite the first end;
    a first spring mounting structure disposed on the stationary structure, the first spring mounting structure comprising a first base for engaging the first mounting portion of the strip spring and at least one spring retention post extending from the first base to retain the first mounting portion against translational disengagement from the first base; and
    a second spring mounting structure disposed on the movable panel, the second spring mounting structure comprising a second base for engaging the second mounting portion of the strip spring.

2. The spring mount assembly of claim 1, wherein the movable panel has an intermediate transition position between the open position and the closed position, and the strip spring is engaged between the movable panel and the stationary structure in an over center configuration, with the strip spring compressing with movement of the movable panel from either the closed position or the open position towards the transition position and decompressing with movement of the movable panel through the transition position to bias the movable panel towards either the closed position or the open position.

3. The spring mount assembly of claim 2, wherein the strip spring defines an opening at the second mounting portion, the strip spring is fully decompressed with movement of the movable panel to the closed position, and with movement of the movable panel past the closed position to an over-travel position, the spring retention tab extends the strip spring by engaging a portion of the second mounting portion bordering the opening.

4. The spring mount assembly of claim 1, wherein the first base is located at a distal end of the first spring mounting structure, and the first spring mounting structure defines an aperture positioned between the first base and a fixed end of the first spring mounting structure.

5. The spring mount assembly of claim 4, wherein the first mounting portion of the strip spring comprises a hook for selective hooking engagement with the first base, passing through the aperture when engaged with the first base.

6. The spring mount assembly of claim 5, wherein the first spring mounting structure comprises a pair of spring retention posts positioned on opposing sides of the hook, such that when the hook is engaged with the first base the pair of spring retention posts prevent translational movement of the hook along a length of the first base.

7. The spring mount assembly of claim 1, wherein the second mounting portion defines an opening, and the second spring mounting portion comprises a spring retention tab extending from the second base and through the opening to retain the second mounting portion to the second base throughout an entire movement range between the closed position and the open position.

8. The spring mount assembly of claim 1, wherein the first base is defined at a distal end of the first spring mounting structure, and the at least one spring retention tab protrudes from the first base at an angle from the first spring mounting structure.

9. The spring mount assembly of claim 8, wherein the second base rotates about the first base with movement of the movable panel between the closed position and the open position, and the angle provides clearance between the spring retention tab and the first mounting portion while the second base rotates about the first base.

10. A spring mount assembly, comprising:
    a stationary structure;
    a movable panel pivotally coupled to the stationary structure for movement between a closed position and an open position;
    a strip spring having a first mounting portion at a first end and a second mounting portion at a second end opposite the first end;
    a first spring mounting structure disposed on the movable panel, the first spring mounting structure comprising a first base for engaging the first mounting portion of the strip spring and at least one spring retention post extending from the first base to retain the first mounting portion against translational disengagement from the first base; and
    a second spring mounting structure disposed on the stationary structure, the second spring mounting structure comprising a second base for engaging the second mounting portion of the strip spring.

11. The spring mount assembly of claim 10, wherein the strip spring defines an opening at the second mounting portion, the strip spring fully decompressed with movement of the movable panel to the closed position, and with movement of the movable panel past the closed position to an over-travel position, the spring retention tab extends the strip spring by engaging a portion of the bordering the opening.

12. The spring mount assembly of claim 10, wherein the movable panel has an intermediate transition position between the open position and the closed position, and the strip spring is engaged between the movable panel and the stationary structure in an over center configuration, with the strip spring compressing with movement of the movable panel from either the closed position or the open position towards the transition position and decompressing with movement of the movable panel through the transition position to bias the movable panel towards either the closed position or the open position.

13. The spring mount assembly of claim 10, wherein the first base is located at a distal end of the first spring mounting structure, and the first spring mounting structure defines an aperture positioned between the first base and a fixed end of the first spring mounting structure.

14. The spring mount assembly of claim 13, wherein the first mounting portion of the strip spring comprises a hook for selective hooking engagement with the first base, passing through the aperture when engaged with the first base.

15. The spring mount assembly of claim 14, wherein the first spring mounting structure comprises a pair of spring retention posts positioned on opposing sides of the hook, such that when the hook is engaged with the first base the pair of spring retention posts prevent translational movement of the hook along a length of the first base.

16. The spring mount assembly of claim 10, wherein the second mounting portion defines an opening, and the second spring mounting portion comprises a spring retention tab extending from the second base and through the opening to retain the second mounting portion to the second base throughout an entire movement range between the closed position and the open position.

17. The spring mount assembly of claim 10, wherein the second base is defined at a distal end of the second spring mounting structure, and the at least one spring retention tab protrudes from the first base at an angle from the first spring mounting structure.

18. The spring mount assembly of claim 17, wherein the first base rotates about the second base with movement of the movable panel between the closed position and the open position, and the angle provides clearance between the spring retention tab and the second mounting portion while the first base rotates about the second base.

* * * * *